(12) United States Patent
Oosawa

(10) Patent No.: US 7,162,066 B2
(45) Date of Patent: Jan. 9, 2007

(54) IMAGE DISPLAY METHOD AND IMAGE DISPLAY APPARATUS

(75) Inventor: Akira Oosawa, Kaisei-machi (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 923 days.

(21) Appl. No.: 09/728,091

(22) Filed: Dec. 4, 2000

(65) Prior Publication Data

US 2001/0002934 A1 Jun. 7, 2001

(30) Foreign Application Priority Data

Dec. 2, 1999 (JP) .............................. 11-342900

(51) Int. Cl.
*G06K 9/00* (2006.01)
*G06K 9/32* (2006.01)
*A61B 6/08* (2006.01)

(52) U.S. Cl. .................... 382/132; 382/294; 378/205

(58) Field of Classification Search ........ 382/128–134, 382/289, 294; 600/419, 420, 437, 512, 523; 378/62, 54, 146, 157, 195, 205, 208, 98; 250/390.02; 345/2.2
See application file for complete search history.

(56) References Cited

U.S. PATENT DOCUMENTS

| | | | | |
|---|---|---|---|---|
| 4,694,479 A | * | 9/1987 | Bacskai et al. ............... 378/58 |
| 4,845,480 A | * | 7/1989 | Satou ......................... 345/2.2 |
| 5,015,854 A | * | 5/1991 | Shigyo et al. ............... 250/584 |
| 5,086,392 A | * | 2/1992 | Nakajima .................... 382/128 |
| 5,092,335 A | * | 3/1992 | Le Bihan .................... 600/410 |
| 5,172,103 A | * | 12/1992 | Kita ........................... 345/667 |
| 5,359,513 A | | 10/1994 | Kano et al. ............. 364/413.23 |
| 5,717,735 A | * | 2/1998 | Ramsdell et al. ........... 378/208 |
| 5,757,952 A | * | 5/1998 | Buytaert et al. ............ 382/132 |
| 5,910,972 A | * | 6/1999 | Ohkubo et al. ............... 378/54 |
| 6,101,238 A | * | 8/2000 | Murthy et al. ................ 378/62 |
| 6,144,873 A | * | 11/2000 | Madore et al. ............. 600/410 |
| 6,466,689 B1 | * | 10/2002 | MacMahon ................. 382/132 |
| 6,594,378 B1 | * | 7/2003 | Li et al. ..................... 382/128 |

FOREIGN PATENT DOCUMENTS

| | | |
|---|---|---|
| JP | 7-37074 | 2/1995 |
| JP | 9-215684 A | 8/1997 |

* cited by examiner

*Primary Examiner*—Kanjibhai Patel
(74) *Attorney, Agent, or Firm*—Sughrue Mion, PLLC

(57) ABSTRACT

An image display apparatus and method which facilitate comparison of two or more images of an identical object. In one embodiment, three images to be compared are displayed at matched positions on an image display after going through the position-matching process conducted by the position matching means, in which the vertical positions of a structural feature area (or a anatomical feature area) of the object are aligned horizontally.

31 Claims, 8 Drawing Sheets

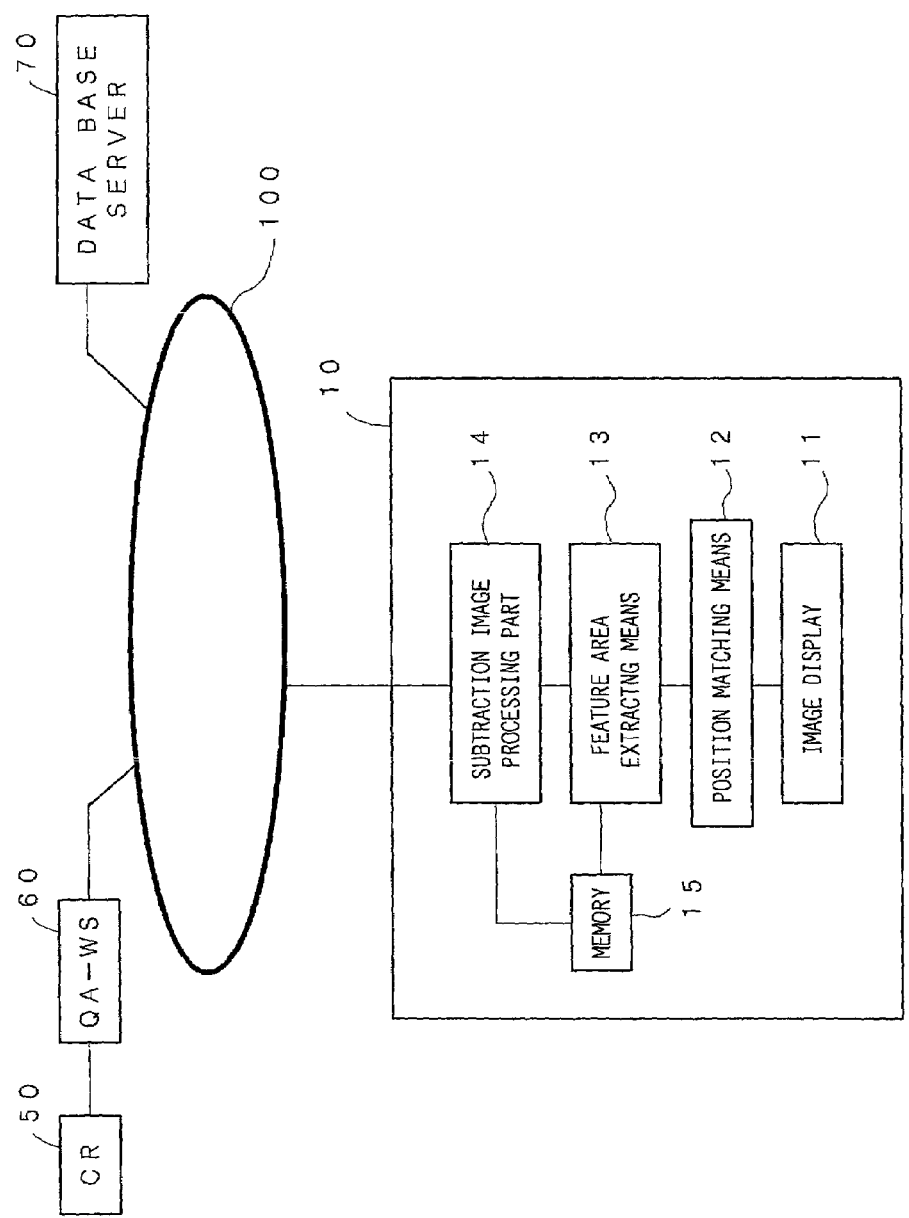

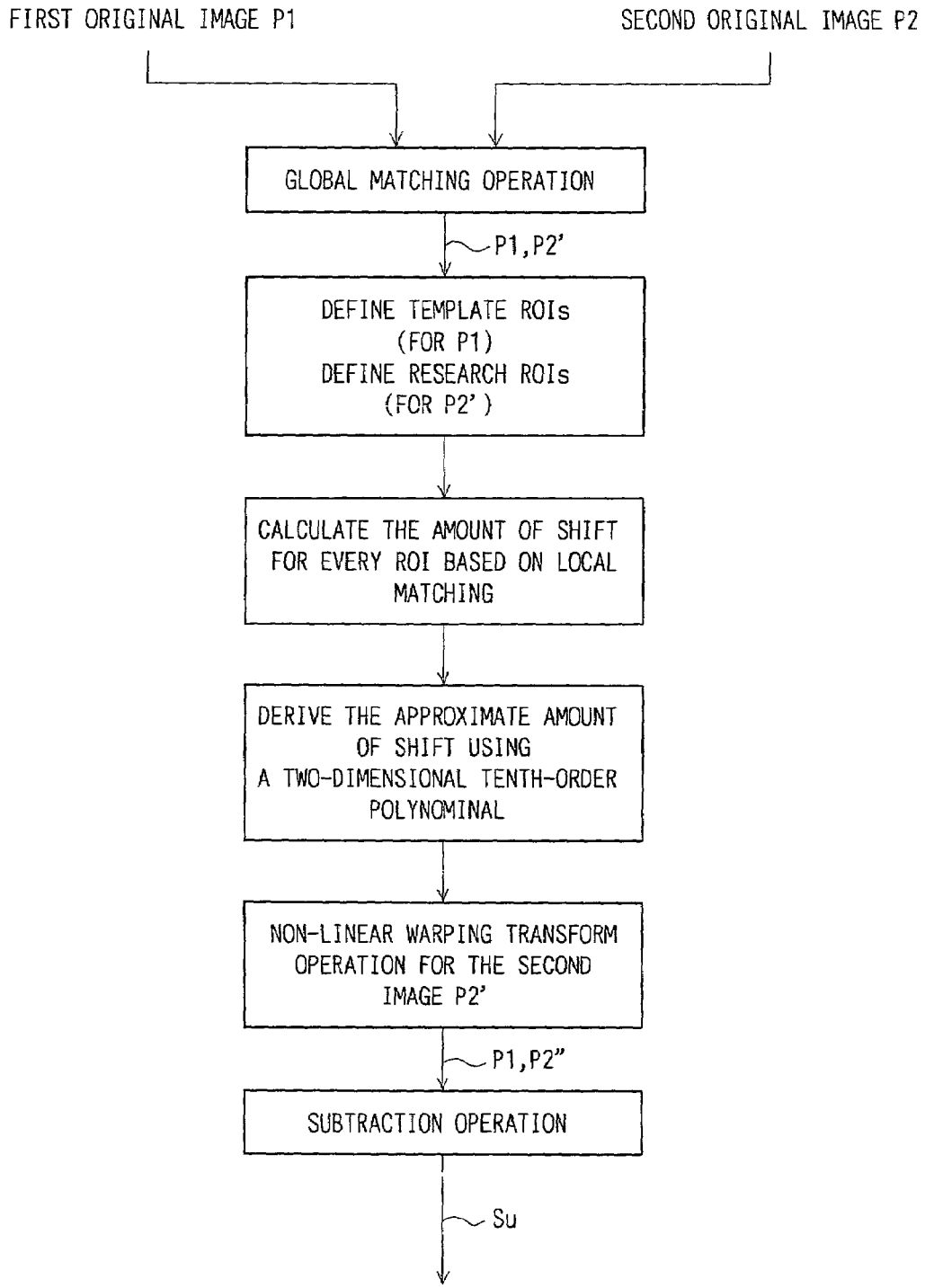
F I G. 3

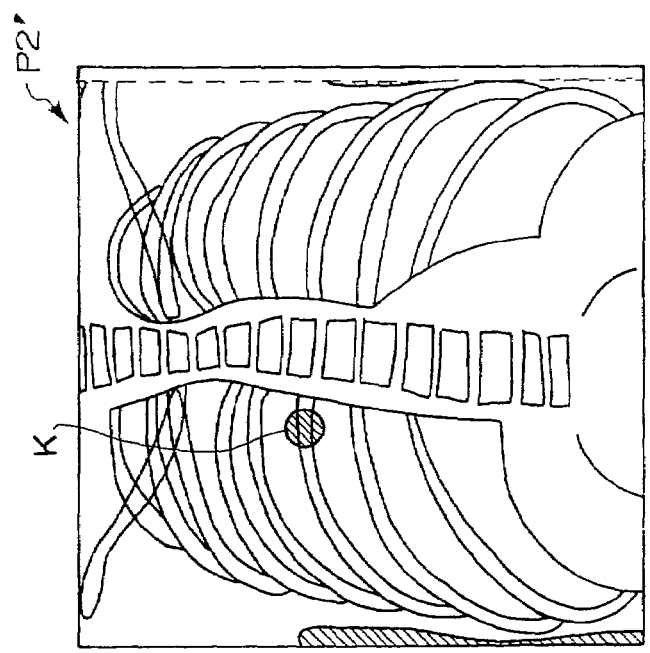
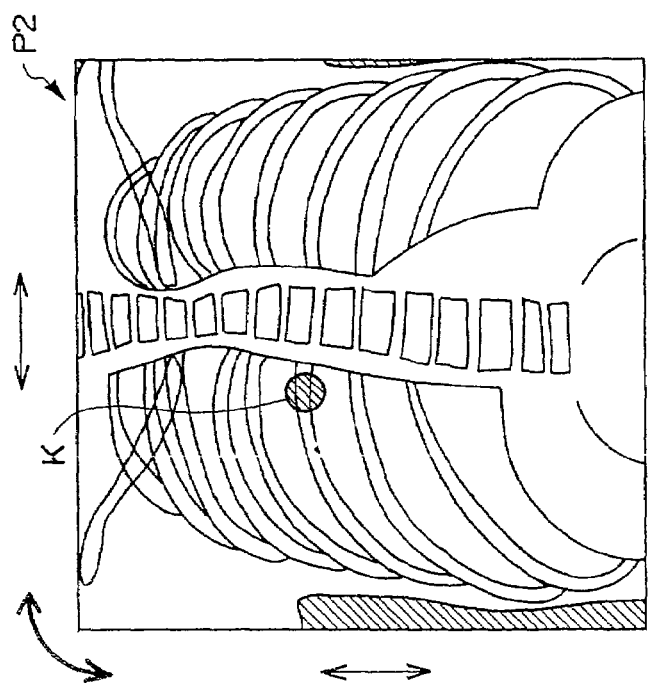
FIG. 4

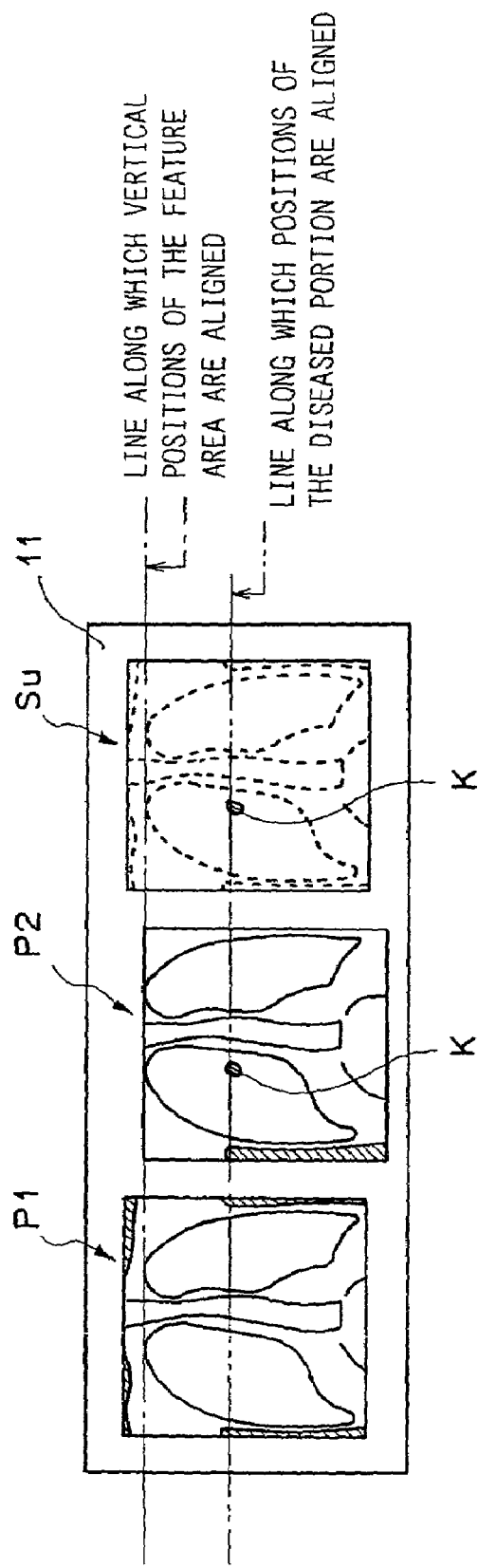

IMAGE DISPLAY METHOD AND IMAGE DISPLAY APPARATUS

BACKGROUND OF THE INVENTION

1. Field of the Invention

The present invention relates to an image display method and an image display apparatus, and more specifically, relates to an improved method and apparatus for displaying two or more images of an identical object.

2. Description of the Related Art

The technique of comparing two or more images of an identical object has been used in various fields to find differences between those images for, e.g., checking the object based on the difference.

For example, in the field of manufacturing industrial products, the above technique has been utilized to search those portions of a product where improvement in endurance is desired by comparing two images, one being an image of a new product and the other being an image of the same product after an endurance test, and finding those portions where great differences are observed between the two images. In the field of medical treatment, as another example, the technique has been used by doctors to follow progress of disease or stages of a cure and plan the most suitable course of treatment by comparing a plurality of radiation images of the same diseased part of a patient taken at different points in time.

When using the technique of comparing two or more images as is used on a daily basis in various fields, those two or more images are often displayed on an image display etc. Before displaying the images on the image display etc., the images are converted to image density signals or luminance signals.

When displaying two or more images to be compared, the images may be displayed either on a single image display or on a plurality of separated image displays. In either case, it has heretofore been common to display the images so that a position of an edge of the entire extent of one image, including the background in the image, is matched to positions of the edges of the other images. With such a manner of display, a location of the object in one image is also matched to locations of the object in other images only in the case where the image portion depicting the object always occupies the same overall location in the image.

However, the position or posture of the object may change between the images to be compared, especially when comparing images taken at long intervals. Such changes in the position or posture often occur particularly in medical images (such as radiation images of a patient), because the level of a camera stage is adjusted many times a day to be optimized to each patient, making it impossible to reproduce the previous level of the camera stage, which was adopted when a previous image of a patient was taken, when taking a new image of the same patient. Practically, it is also impossible to precisely reproduce the posture of the patient with respect to the central axis of the body etc.

Thus, the object (i.e., the region of interest or the region to be compared) in each image appears at an unmatched location when two or more images to be compared are displayed in the conventional manner (i.e., when the images are displayed so that the position of the edge of the entire extent of one image is matched to the positions of the edges of the other images), as the position or posture of the object usually changes between the images to be compared as described above.

It is difficult to compare two or more images correctly in the situation where the object (i.e., the region of interest) occupies different locations in the two or more images to be compared, which may cause the difference between the image portions depicting the object to be overlooked.

SUMMARY OF THE INVENTION

The object of the present invention is to provide an image display method and an image display apparatus for displaying two or more images of an identical object to be compared, which facilitate the comparison between the two or more images.

The image display method and the image display apparatus of the present invention facilitate the comparison between the two or more images of the identical object by displaying those images so that a position of a structural feature area of the object in each image is matched to the positions of the same structural feature area of the object in the other images.

In other words, the image display method of the present invention displays two or more images of an identical object to be compared, wherein the two or more images are displayed together with positions of a structural feature area of the identical object in the two or more images aligned along a straight line.

The object herein referred to is not limited to the human body but may be of any kind including an animal, a plant, an industrial product, a landform, a celestial body and landscape. The structural feature area is not limited to an external structure but may instead be an anatomical structure (e.g., the lung, the sternum, the regions of neck, etc.). Most preferably, the structural feature area is a feature area (e.g., an upper or lower end portion, a leftmost or rightmost end portion, a central portion, etc.) of a structure to be imaged and compared, as such a feature area is the region of the greatest interest herein.

In aligning the positions of the structural feature area along a straight line, the images may be arranged in a row so that vertical positions of the structural feature area are aligned along a horizontal line or horizontally, or may be arranged in a column so that horizontal positions of the structural feature area are aligned along a vertical line or vertically.

The method of the present invention is particularly remarkable when comparing images of a dynamic object, and thus a radiation image of the human body for medical use may be selected as each of the two or more images of the identical object to be compared. In the case of comparing the medical radiation images, each of the two or more images of the identical object to be compared may be an original image. Otherwise, it is possible to select as the images to be compared at least one of a plurality of original images and a subtraction image, which is derived by matching positions of two images selected out of the plurality of original images and taking a differential between those two images. The subtraction image herein referred to may be, for example, an energy subtraction image derived through a simple subtraction operation or a weighted subtraction operation from two original images (i.e., a high energy image (or a normal radiation image) and a low energy image (or a radiation image taken with radiation of limited energy)) which are taken at substantially the same point in time but have energy distributions different from each other, a temporal subtraction image derived from two original images taken at different points in time, or a DSA image (digital subtraction angiography image) derived from two original images of a blood vessel taken before and after injection of a contrast medium.

In the case where two images are displayed for comparison, those two displayed images may be two original images or may be one original image and one subtraction image. Similarly, in the case where three images are displayed for comparison, those three displayed image may be either of three original images, two original images and one subtraction image derived therefrom, one original image which is the latest one (in the case of temporal subtraction) or which represents the normal state most typically (i.e., the high energy image in the case of energy subtraction or the image taken before injection of the contrast medium in the case of DSA) and two subtraction images, or three subtraction images.

When displaying images, it is desirable to add each of the images onto the image display one by one to accomplish thorough comparison of the images, rather than displaying the two or more images all at once. That is to say, an observer tends to pay less attention to each image when a plurality of images appear on the image display all at once, trying to look over all images at one time, whereas the observer can address the spots to be compared based on the observation of the first displayed image before moving on to the second image.

The two or more images may be displayed on a single image display or may be displayed individually on separated image displays. In the case where the images are displayed individually on the separated image displays at unmatched vertical positions or unmatched horizontal positions, the images on the separated image displays may be aligned based on the difference between the unmatched vertical positions or displacement of the centers of the images in horizontal directions, so that the position of the structural feature area of the object in each image is matched to the positions of the same structural feature area of the object in the other images.

The image display apparatus of the present invention is an image display apparatus for displaying two or more images of an identical object to be compared which is capable of practicing the image display method of the present invention as described above, comprising image display means for displaying the two or more images thereon and position matching means for arranging the two or more images so that positions of a structural feature area of the identical object in the two or more images are aligned along a straight line.

The position matching means may arrange the images in a row so that vertical positions of the structural feature area are aligned horizontally, or may arrange the images in a column so that horizontal positions of the structural feature area are aligned vertically.

A radiation image of the human body for medical use may be selected as each of the two or more images of the identical object to be compared using the apparatus of the present invention. In the case of comparing the radiation images for medical use, each of the two or more images of the identical object to be compared may be an original image. Otherwise, it is possible to select as the images to be compared at least one of a plurality of original images and a subtraction image, which is derived by matching positions of two images selected out of the plurality of original images and taking a differential between the selected two images.

The two original images may be those images taken at different points in time.

The image display means is preferably configured to add each of the two or more images onto an image display one by one.

The observer can easily find the differences between the two or more images of the identical object to be compared using the image display method or the image display apparatus of the present invention, as positions of the structural feature area of the object in the images are displayed aligned along a straight line providing good positional agreement between the two or more images which facilitates comparison between the portions of the images depicting the same structural feature area.

BRIEF DESCRIPTION OF THE DRAWINGS

FIG. 1 illustrates one embodiment of the image display apparatus according to the present invention, FIG. 4 illustrates the concept of the global matching operation, FIG. 8 illustrates how three images are displayed on the image display.

DESCRIPTION OF THE PREFERRED EMBODIMENTS

Figure 2B:
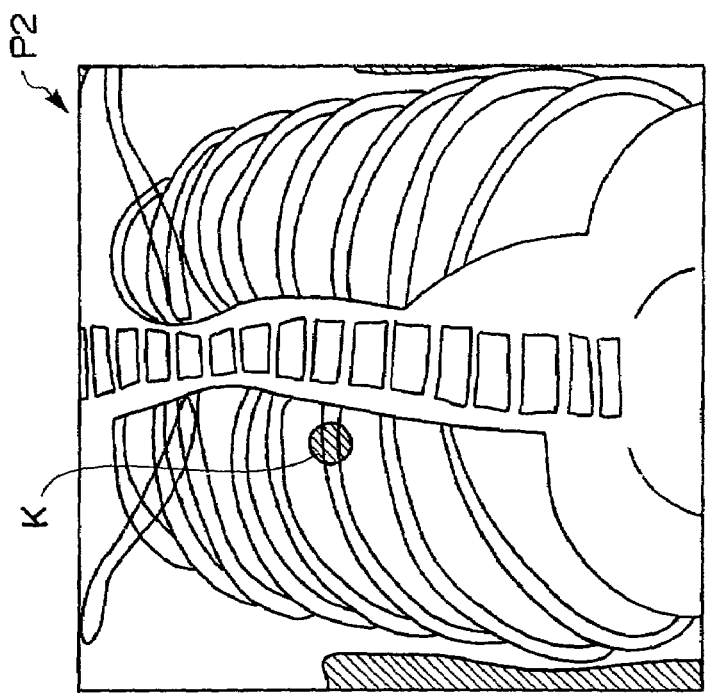
FIGS. 2A and 2B show an example of a pair of original images displayed by the image display apparatus shown in FIG. 1, FIG. 3 schematically illustrates an entire process used for carrying out temporal subtraction.

Now, embodiments of the image display method and image display apparatus according to the present invention will be described with reference to the accompanying drawings.

FIG. 1 illustrates a medical image network 100 including an image display apparatus 10 which is one embodiment of the image display apparatus according to the present invention.

Connected to the network 100 shown in FIG. 1 are, for example, one or more image generating apparatuses for generating medical images such as a CT (computerized tomography) apparatus, an MRI (magnetic resonance imaging) apparatus and a CR (computer radiography) apparatus 50, a database server 70 for storing diagnostic medical images of any kind generated by the image generating apparatus, the image display apparatus 10 for displaying those images stored in the database server 70 or those images sent directly from the image generating apparatus, and so on. A printer or a similar device is also connected to the network 100 to output the images handled in the network 100 onto a film etc. The printer, the CT apparatus and the MRI apparatus are not shown in FIG. 1.

The CR apparatus 50 is an apparatus for obtaining an image of radiation which has passed through the object as a digital image, by having the radiation which has passed the object project onto an accumulation phosphor sheet comprising a stimulable phosphor layer so that the radiation image of the object is recorded on the accumulation phosphor sheet, and photoelectrically reading the light emitted from the accumulation phosphor sheet exposed to a laser beam, wherein the amount of light emitted from the accumulation phosphor sheet is in proportion to the amount of radiation energy stored thereon. The CR apparatus of such a kind has been used widely in a variety of medical institutions such as hospitals.

A QA-WS (image quality analyzing workstation) 60 connected between the CR apparatus 50 and the network 100 is a workstation having several functions, including a function of checking the diagnostic medical image generated by the image generating apparatus such as the CR apparatus 50 described above and a function of sending a request to the image generating apparatus to re-obtain the image therefrom when necessary. The QA-WS 60 as used in the present embodiment displays a digital image P generated by the CR apparatus 50 before storing the image in the database server 70 to enable preliminary checking of image quality (e.g., image density and image contrast), extent of the image and so on.

The image display apparatus 10 has several functions including not only a simple display function of displaying the image input via the network 100 as a visible image but also a function of conducting the subtraction operation to derive a temporal subtraction image Su from two or more images P of the same diseased portion of the same patient which are taken at different points in time. The image display apparatus 10 herein comprises a subtraction image processing part 14 for deriving the temporal subtraction image Su, a memory 15 which stores an image temporarily, feature area extracting means 13 for detecting a position of an anatomical feature area (e.g., an upper end portion of the lung) in the image, position matching means 12 for conducting a transform operation to match vertical positions of the anatomical feature area in two or more images so that the images can be displayed with the vertical positions of the anatomical feature therein horizontally aligned, and an image display (image display means) 11 for displaying the two or more images at matched positions arranged by the position matching means 12.

Now, functions of the image display apparatus 10 will be explained in detail in the following.

It is assumed herein that radiation images P1 and P2 of the chest part of a certain patient were taken in advance using the CR apparatus, went through the check by the QA-WS 60, were sent to the database server 70 via the network 100, and have been stored in the database server 70. Header information is attached to each of the images P1 and P2 stored in the database server 70. In the present embodiment, the header information includes an ID number which is unique to the patient, a code representing an imaged site of the object (the chest part in the ongoing description) and orientation of the object upon imaging, and a date of imaging.

First of all, the two images P1 and P2, to which the same ID number, the same code and different dates of imaging are attached, are input to the image display apparatus via the network 100 from the database server 70. In other words, the two images P1 and P2 are images taken on different dates to be compared on a temporal basis, both of which are front images of the chest part of the same patient (see FIGS. 2A and 2B). It is assumed herein that the first image P1 was taken on an earlier date than the second image P2, i.e., the first image P1 can be referred to as a past image and the second image P2 can be referred to as a present image.

Figure 2A:
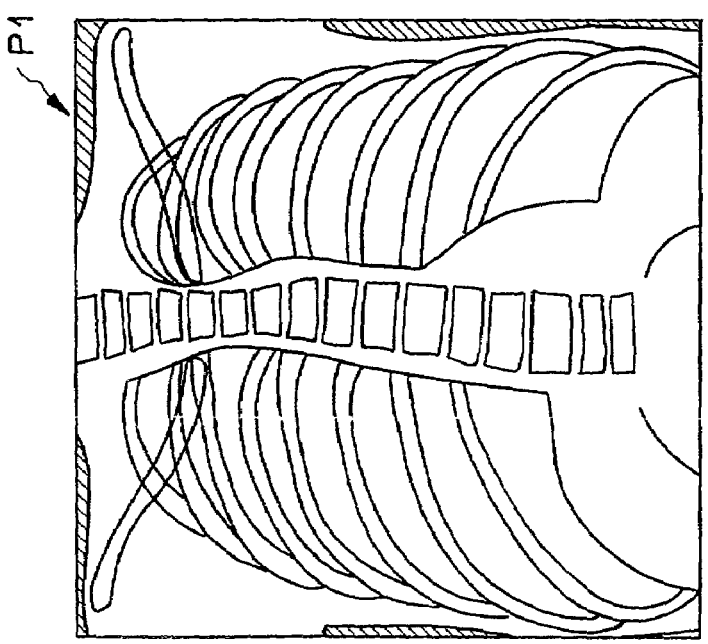

The images P1 and P2 input to the image display apparatus 10 are sent to the subtraction image processing part 14 at first. The subtraction image processing part 14 conducts the temporal subtraction operation in which subtraction between the two images is calculated on a pixel-by-pixel basis. However, as shown in FIGS. 2A and 2B, it is quite rare for the object (e.g., the chest part of the patient) to be located at precisely the same location within the two images. Therefore, there is a risk of incorrect subtraction between different organs, e.g., between a bone portion and a soft tissues portion, if the subtraction operation was carried out on the pixel-by-pixel basis without performing position-matching.

To avoid this risk, the subtraction image processing part 14 actually conducts the subtraction operation after conducting a position-matching operation as illustrated in FIG. 3. The entire process carried out in the subtraction image processing part 14 will now be explained in the following.

The process begins with a global matching operation between the first original image P1 and the second original image P2. The global matching operation applies an affine transform operation to the second original image P2 in order to match the second original image P2 to the first original image P1, transforming the second original image P2 to a second image P2' as shown in FIG. 4.

Figure 5:
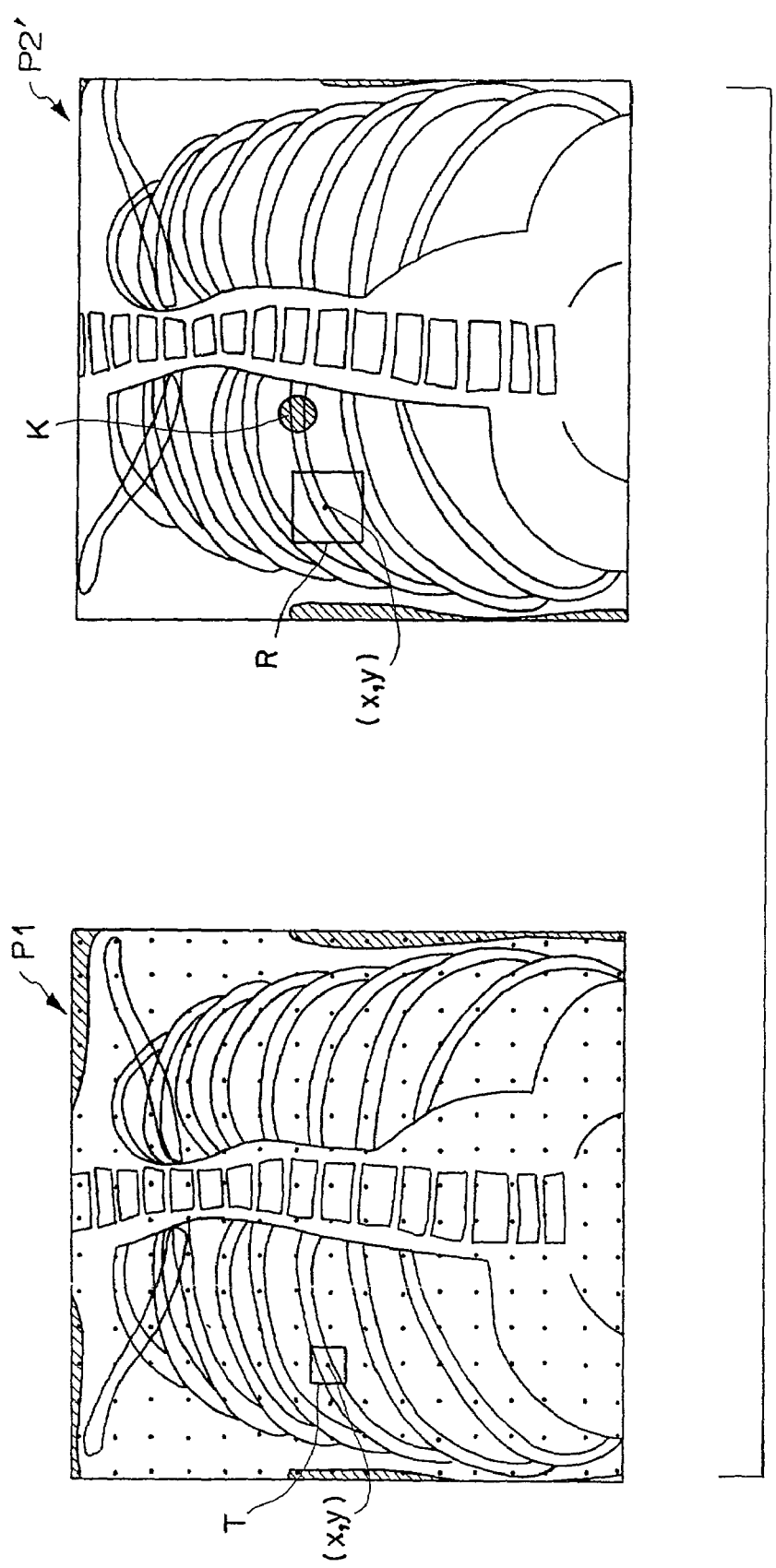
FIG. 5 illustrates the concept of the local matching operation.

Then, the subtraction image processing part 14 divides the first original image P1 into a plurality of regions of interest (ROIs) T, in which a pixel in the center of each ROI(T) is represented by a position (x,y) in the x-y coordinate (see FIG. 5). The subtraction image processing part 14 also defines research ROIs (R) in the second image P2'. Each of the research ROIs (R) is defined corresponding to each ROI (T) in the first original image P1, and is provided with a position (x,y) which is identical to that of one of the ROIs (T) and an area four times as large as that of each ROI (T) (i.e., each dimension of the area is twice as long as that of each ROI (T)).

The subtraction image processing part 14 next finds a position where the highest degree of matching is obtained between the images P1 and P2' (the position is referred to by (x',y'), representing a matched position of the center of an ROI) for every ROI (R) by moving an ROI (T) defined in the first original image P1 within the corresponding research ROI (R) defined in the second image P2 (in other words, the amount of shift is calculated for every ROI based on local matching). A standard value which represents the degree of matching may be a value based on the least square or cross-correlation between the two images.

Figure 6:
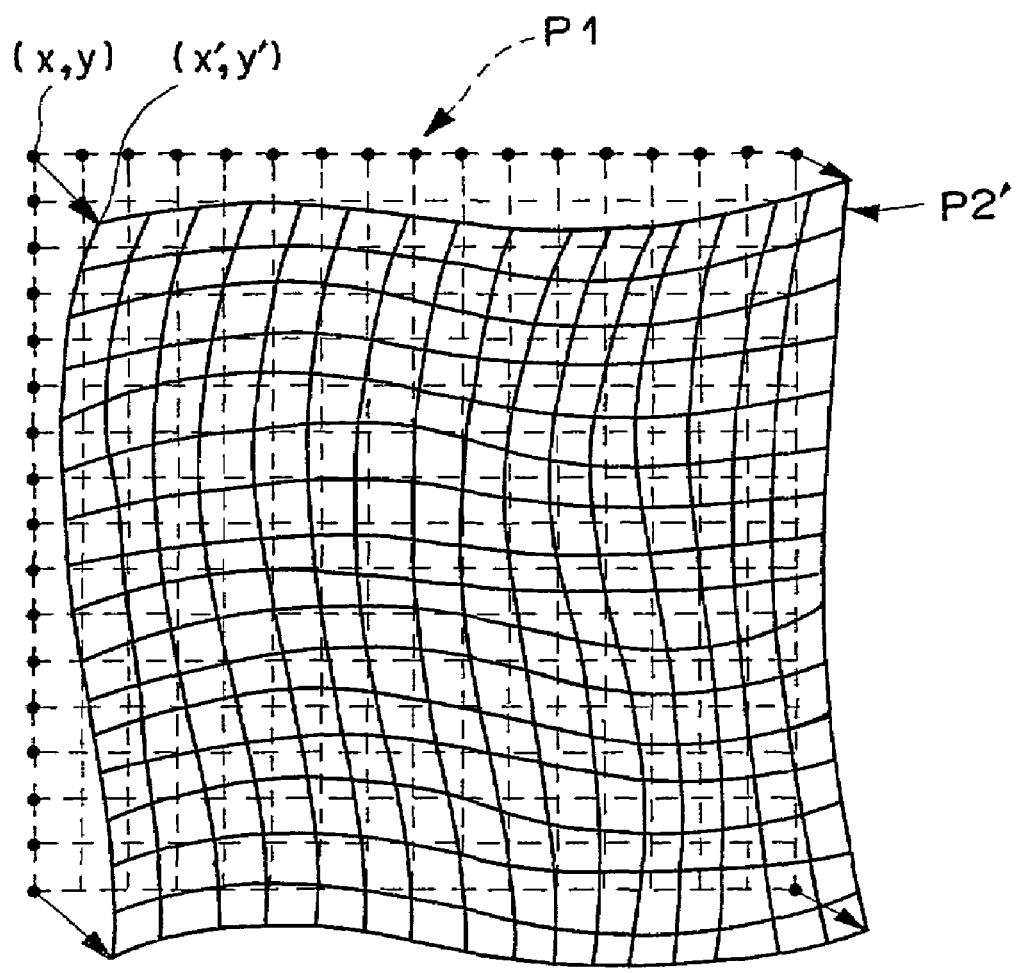
FIG. 6 illustrates the concept of the non-linear warping transform operation.

Illustrated in FIG. 6 is the amount of shift ($\Delta x$, $\Delta y$) (wherein $\Delta x = x' - x$ and $\Delta y = y' - y$) between the two images P1 and P2' derived for each pixel (x,y) in the center of an ROI in the manner described above. Then, approximation is carried out using a two-dimensional tenth-order polynominal to re-calculate the amount of shift ($\Delta x$, $\Delta y$) to be applied to each pixel in the second image P2' from each amount of shift ($\Delta x$, $\Delta y$) for each pixel (x,y) derived above based on local matching. A non-linear warping transform operation (hereinafter, referred to simply as the warping operation) is then applied to the second image P2' to shift the position of each pixel (x,y) in the second image P2' in accordance with the re-calculated amount of shift ($\Delta x$, $\Delta y$) for the pixel.

Figure 7C:
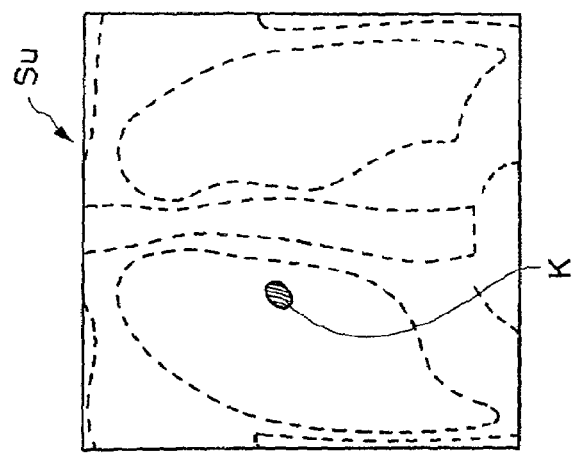
FIGS. 7A, 7B and 7C show an example of a first original image P1, a second transformed image P2" and a subtraction image Su.
Figure 7B:
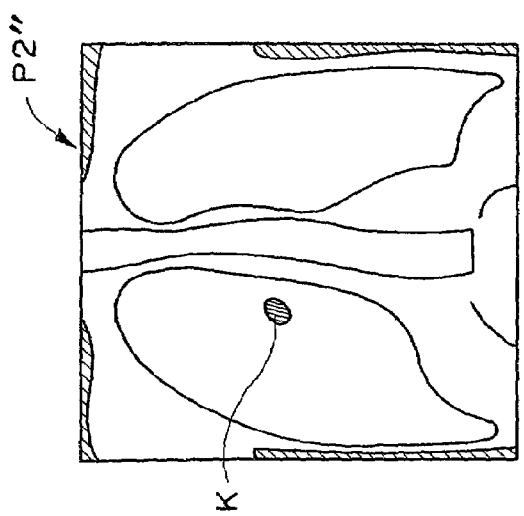
Figure 7A:
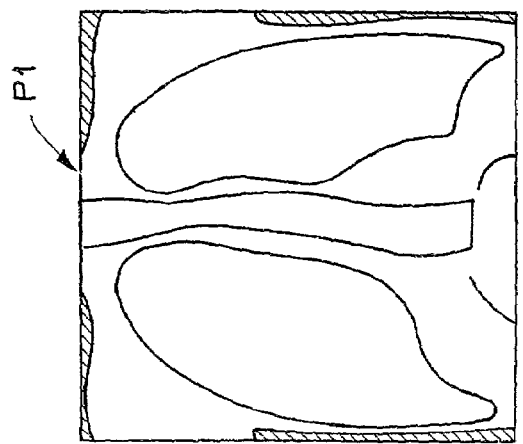

Positions of organs in a second transformed image P2" obtained by warping the second image P2' match quite well to the positions of organs appearing in corresponding pixels in the first original image P1 (see the images in FIG. 7A and 7B). A temporal subtraction image Su (the image in FIG. 7C), which contains very few artifacts due to unmatched borders between the organs, is derived by subtracting the first original image P1 from the second transformed image P2" on a pixel-by-pixel basis. Emerging clearly in the temporal subtraction imaging Su is a diseased portion K in the left lung, which does not exist in the first original image P1 but exists in the second original image P2. Accordingly, growth of the diseased portion K over time from the past to the present can be followed correctly by displaying the temporal subtraction image Su as a visible image.

Although the subtraction image processing part 14 in the embodiment described above practices the local matching operation after applying the global matching operation to at least one image, the subtraction image processing part 14 may instead practice only the local matching operation skipping the global matching operation. In addition, although the transform operations (e.g., the affine transform operation and the non-linear warping transform operation) are applied only to the second original image P2 in the embodiment described above, such transform operations may instead be applied to the first original image P1 only or to both of the first original image P1 and the second original image P2.

Further, although the subtraction image processing part 14 is incorporated in the image display apparatus 10 in the above embodiment, the subtraction image processing part 14 may instead be located at a part in the network 100 such as a separated subtraction image processing apparatus, or may be incorporated in the QA-WS 60.

The temporal subtraction image Su obtained in the above manner is sent to the feature area extracting means 13 together with the two original images P1 and P2 which have been stored temporarily in the memory 15. The feature area extracting means 13 detects a position of the anatomical feature area (e.g., an upper end portion of the lung) in each of the images P1, P2 and Su. Then the position matching means 12 performs the position-matching operation between those images P1, P2 and Su, so that the detected vertical positions of the anatomical feature area in the images P1, P2 and Su are aligned horizontally. In the present embodiment, position matching of the anatomical feature area between the first original image P1 and the subtraction image Su can be automatically accomplished by matching the vertical positions of the upper ends of the images, as the subtraction image Su herein is such a one calculated from the first original image P1 and the second transformed image P2" derived by matching the position thereof to the original image P1.

As shown in FIG. 8, the images P1, P2 and Su are displayed on the image display 11 in a row after the position-matching operation for the anatomical feature area therein, with the vertical positions of the anatomical feature area (i.e., an upper end portion of the lung in the present embodiment) therein horizontally aligned.

A doctor etc. can now determine the position where the diseased portion K (which does not exist in the first original image) has developed by observing and comparing the images P1, P2 and Su displayed on the image display 11 with the vertical positions of the anatomical feature area therein horizontally aligned. Accordingly, such agreement of vertical positions improves the efficiency of diagnosis.

Agreement between the vertical positions etc. of the region of interest (i.e., the structural feature area of the object) cannot be achieved using the conventional display method in which the images are displayed with the upper end or center of the entire extent of each image aligned along a straight line, because the location of the object within an image often varies image-by-image, especially when selecting those images taken at different points in time as the images to be displayed and compared, as is the case in the present embodiment. With such incomplete alignment, the observer may accidentally misread one of corresponding positions in two images by, for example, an interval corresponding to a gap between two adjacent chest bones. However, such misreading can be effectively prevented to improve the efficiency of diagnosis by aligning the positions of the structural feature area of the object in the images along a straight line as the image display apparatus of the present embodiment does, instead of aligning the features of frames of the images.

Although three images including two original images and one subtraction image derived therefrom are selected as the images to be displayed by the image display apparatus in the embodiment described above, images of other combination can also be displayed concurrently using the image display apparatus and the image display method of the present invention. For example, an operator may select two original images only or two images including one original image (either of the past image or the present image) and one subtraction image as the images to be displayed.

In addition, it is not required that the two or more images to be displayed should be displayed on a single image display (image display means), and the images may instead be displayed individually on separated image displays. For example, the operator may display two original images on one image display and display one subtraction image on another image display. The operator may input a vertical position of each image display etc. to the position matching means 12 in advance, so that the two or more images to be compared are displayed on the image displays (11 etc.) with the positions of the structural feature area of the object in the images aligned along a straight line also in the case where a plurality of image display are used.

Further, although the temporal subtraction images, obtained through a process described mainly in Japanese Unexamined Patent Publication No. 7(1995)-37074, are selected as the images to be displayed by the image display apparatus in above the embodiment, images of other types can also be displayed using the image display apparatus and the image display method of the present invention. For example, a set of images to be displayed together may include two original images (one high energy image and one low energy image) which are taken at substantially the same point in time but have energy distributions different from each other and an energy subtraction image derived therefrom, or two original images of a blood vessel taken before and after injection of a contrast medium and a DSA image derived therefrom. More generally, any set of images may be selected as the images to be displayed together as long as the set of images includes two or more images of the identical object to be compared, whether the object is a living body or not.

In addition, all of the contents of Japanese Patent Application No. 11(1999)-342900 are incorporated into this specification by reference.

What is claimed is:

1. An image display method for displaying two or more images of an identical object to be compared, wherein the two or more images are displayed together in a row or a column with positions of a structural feature area of the identical object in the two or more images aligned horizontally or vertically, wherein each of the two or more images is added onto an image display one by one.

2. An image display method according to claim 1, wherein each of the two or more images of the identical object to be compared is a radiation image for medical use.

3. An image display method according to claim 2, wherein each of the two or more images of the identical object to be compared is an original image.

4. An image display method according to claim 3, wherein the two or more original images are taken at different points in time.

5. An image display method according to claim 2, wherein the two or more images of the identical object to be compared include at least one of a plurality of original images and a subtraction image, which is derived by matching positions of two images selected out of said plurality of original images and taking a differential between the selected two images.

6. An image display method according to claim 5, wherein said plurality of original images are taken at different points in time.

7. An image display method according to claim 1, wherein the two or more images physically occupy different areas of a display when the two images are simultaneously displayed.

8. An image display method according to claim 1, wherein a first of the two images represents the object at a first time, and a second of the two objects represents the object at a second time different from the first time.

9. An image display method according to claim 1, wherein the position of the structural feature area of the identical object in the two or more images are displayed according to one of the following:
  1) the identical object in two images are displayed at a common horizontal coordinate but different vertical coordinate and
  2) the identical objects in the two images are displayed at a common vertical coordinate but different horizontal coordinate.

10. An image display method according to claim 1, wherein said two or more images are displayed together in a row or column are arranged side by side at a given time.

11. An image display method according to claim 1, wherein said structural feature area of the identical object comprises an anatomical region of interest to be compared.

12. An image display method according to claim 1, wherein said structural feature area of the identical object comprises a part of a human body.

13. An image display method according to claim 1, wherein said structural feature area of the identical object comprises at least one of a human body, an animal, a plant, an industrial product, a landform, a celestial body and a landscape.

14. An image display method according to claim 1, further comprising physically aligning horizontally or vertically the two or more displayed images according to the structural feature area of the identical object.

15. An image display apparatus for displaying two or more images of an identical object to be compared, comprising
  image display means for displaying the two or more images thereon and
  position matching means for arranging the two or more images in a row or a column so that positions of a structural feature area of the identical object in the two or more images are aligned horizontally or vertically,
  wherein the image display means adds each of the two or more images onto an image display one by one.

16. An image display apparatus according to claim 15, wherein each of the two or more images of the identical object to be compared is a radiation image for medical use.

17. An image display apparatus according to claim 16, wherein each of the two or more images of the identical object to be compared is an original image.

18. An image display apparatus according to claim 17, wherein the two or more original images are taken at different points in time.

19. An image display apparatus according to claim 16, wherein the two or more images of the identical object to be compared include at least one of a plurality of original images and a subtraction image, which is derived by matching positions of two images selected out of said plurality of original images and taking a differential between the selected two images.

20. An image display apparatus according to claim 19, wherein said plurality of original images are taken at different points in time.

21. An image display apparatus according to claim 19, wherein said subtraction image is obtained after a position matching operation of the position matching means.

22. An image display apparatus according to claim 15, wherein said image display means conducts a subtraction processing to derive a subtraction image from the two or more images.

23. An image display apparatus according to claim 15, wherein the two or more images physically occupy different areas of a display when the two images are simultaneously displayed.

24. An image display apparatus according to claim 15, wherein a first of the two images represents the object at a first time, and a second of the two objects represents the object at a second time different from the first time.

25. An image display apparatus according to claim 15, wherein the position of the structural feature area of the identical object in the two or more images are displayed according to one of the following:
  1) the identical object in two images are displayed at a common horizontal coordinate but different vertical coordinate and
  2) the identical objects in the two images are displayed at a common vertical coordinate but different horizontal coordinate.

26. An image display apparatus according to claim 15, wherein said structural feature area of the identical object comprises an anatomical region of interest to be compared.

27. An image display apparatus according to claim 15, wherein said structural feature area of the identical object comprises a part of a human body.

28. An image display apparatus according to claim 15, wherein said structural feature area of the identical object comprises at least one of a human body, an animal, a plant, an industrial product, a landform, a celestial body and a landscape.

29. An image display apparatus according to claim 15, wherein said two or more images are physically aligned horizontally or vertically on the image display means according to the structural feature area of the identical object.

30. An image display method for displaying two or more images of an identical object to be compared, wherein
  the two or more images are displayed together in a row or a column with positions of a structural feature area of the identical object in the two or more images aligned horizontally or vertically,
  wherein each of said two or more images comprises a header information wherein said header information comprises:
  an ID number which is unique to an object;
  a code representing an imaged site of the object;
  an orientation information of the object upon imaging; and
  a date of imaging.

31. An image display method according to claim 30, wherein said two or more images comprise the same ID number, the same code and a different date of imaging.

* * * * *